United States Patent
Faulkner et al.

(10) Patent No.: US 12,389,825 B2
(45) Date of Patent: Aug. 19, 2025

(54) SPREADER DISTRIBUTION COMPENSATION THROUGH MATERIAL FLOW MANIPULATION

(71) Applicant: DEERE & COMPANY, Moline, IL (US)

(72) Inventors: Christopher J. Faulkner, Eldridge, IA (US); Nathan R. Vandike, Geneseo, IL (US); Martin Rittershofer, Zweibrücken (DE)

(73) Assignee: DEERE & COMPANY, Moline, IL (US)

( * ) Notice: Subject to any disclaimer, the term of this patent is extended or adjusted under 35 U.S.C. 154(b) by 726 days.

(21) Appl. No.: 17/660,844

(22) Filed: Apr. 27, 2022

(65) Prior Publication Data

US 2023/0100290 A1 Mar. 30, 2023

Related U.S. Application Data

(60) Provisional application No. 63/261,734, filed on Sep. 28, 2021.

(51) Int. Cl.
*A01D 41/12* (2006.01)
*A01D 41/127* (2006.01)

(52) U.S. Cl.
CPC ....... *A01D 41/1243* (2013.01); *A01D 41/127* (2013.01)

(58) Field of Classification Search
CPC .... A01D 41/127; A01D 41/1243; A01F 12/40
See application file for complete search history.

(56) References Cited

U.S. PATENT DOCUMENTS

| | | | |
|---|---|---|---|
| 7,306,174 B2* | 12/2007 | Pearson | A01F 12/40 239/665 |
| 8,010,262 B2* | 8/2011 | Schroeder | A01D 41/1243 701/50 |
| 9,066,470 B2* | 6/2015 | Ricketts | A01D 41/1243 |
| 9,345,198 B2 | 5/2016 | Pohlmann et al. | |
| 2015/0264864 A1* | 9/2015 | Branch | A01D 41/1243 701/50 |
| 2021/0084820 A1 | 3/2021 | Vandike et al. | |
| 2022/0408642 A1* | 12/2022 | Mygind Bojsen | A01D 41/1243 |

FOREIGN PATENT DOCUMENTS

EP 1408732 B1 3/2007

* cited by examiner

*Primary Examiner* — Joseph M Rocca
*Assistant Examiner* — Robert E Pezzuto

(57) ABSTRACT

A residue distribution system includes a flow channel having a first lateral side and a second lateral side disposed. A spreader is positioned proximate a downstream end of the flow channel, and broadcasts the flow of the crop residue. A residue distributor is positioned within the flow channel and upstream of the spreader for directing the crop residue toward one of the first lateral side or the second lateral side of the flow channel to increase a mass of the crop residue that side of the spreader, whereby a discharge density of the crop residue on that side of the spreader is increased to overcome effects of a crosswind or an uphill side-slope on broadcast distribution of the crop residue.

21 Claims, 7 Drawing Sheets

SPREADER DISTRIBUTION COMPENSATION THROUGH MATERIAL FLOW MANIPULATION

CROSS-REFERENCE TO RELATED APPLICATIONS

This application claims the benefit of U.S. Provisional Patent Application Ser. No. 63/261,734, filed on Sep. 28, 2021, the disclosure of which is hereby incorporated by reference.

TECHNICAL FIELD

The disclosure generally relates to a harvester implement for harvesting crop material from a field, and more particularly to a residue distribution system of the harvester implement.

BACKGROUND

Crops may be harvested from a field with a harvester implement. One example of a harvester implement combines reaping, threshing, and cleaning of the harvested crop material into a single implement. Such implements may be referred to as "combine harvesters", or simply as "combines". The harvester implements often separate the crop material into grains and straw. The straw may be considered the crop residue. The straw or crop residue is deposited back onto the ground surface of the field.

Often, the straw is chopped and broadcast from the harvester implement to spread the crop residue across the field. It is desirable to evenly spread the crop residue across a width of the field that is approximately equal to a harvest width. However, a side-slope angle of the ground surface and/or a crosswind while broadcasting the crop residue may negatively effect or prevent an even distribution of the crop residue over the ground surface, causing the crop residue to settle on a downhill side or downwind side of the ground surface.

SUMMARY

A residue distribution system for a harvester implement is provided. The residue distribution system includes a housing defining a flow channel. The flow channel extends along a longitudinal axis and is configured for conducting a flow of a crop residue therethrough. The flow channel directs the crop residue in a direction moving from an upstream end of the flow channel toward a downstream end of the flow channel. The flow channel includes a first lateral side disposed on a first side of the longitudinal axis, and a second lateral side disposed on a second side of the longitudinal axis. A spreader is positioned proximate the downstream end of the flow channel. The spreader is operable to broadcast the flow of the crop residue across a residue distribution width extending perpendicular to the longitudinal axis. A residue distributor is positioned within the flow channel and upstream of the spreader. The residue distributor is operable to direct the flow of the crop residue toward one of the first lateral side and the second lateral side of the flow channel to increase a mass flow rate of the crop residue passing through the spreader on the one of the first lateral side and the second lateral side of the flow channel, whereby a discharge density of the flow of the crop residue on the one of the first lateral side and the second lateral side is increased.

In one implementation of the disclosure, the residue distributor may include at least one fin that is selectively controllable between a first position and a second position. When the fin is disposed in the first position, the fin is operable to direct the flow of the crop residue toward the first lateral side of the flow channel. When the fin is disposed in the second position, the fin is operable to direct the flow of the crop residue toward the second lateral side of the flow channel. The at least one fin may include only a single fin. However, in other implementations, the at least one fin may include a plurality of fins, with the plurality of fins arranged across a width of the flow channel transverse to the longitudinal axis.

In another aspect of the disclosure, the at least one fin may be selectively controllable into at least one intermediate position. The intermediate position is disposed between the first position and the second position. For example, the intermediate position may be approximately half way between the first position and the second position and configured to not effect the path of the flow of the crop residue, i.e., not direct the flow of the crop residue toward either the first lateral side or the second lateral side of the flow channel. It should be appreciated that the at least one intermediate position may include multiple positions between the first position and the second position, with each respective one of the plurality of intermediate positions directing the flow of the crop residue, to a varying amount, toward one of the first lateral side or the second lateral side of the flow channel.

In one aspect of the disclosure, the residue distributor may include a fin actuator. The fin actuator may be either directly or indirectly coupled to the fin(s). The fin actuator may be configured to move the fin(s) between the first position and the second position. In one implementation, the fin actuator may include one of a linear actuator or a rotary actuator. The linear actuator may be configured to extend in a first linear direction and retract in a second linear direction that is opposite the first linear direction. The rotary actuator may be configured to rotate in a first rotational direction and a second rotational direction opposite the first rotational direction. The fin actuator may include, but is not limited to, an electrically activated system, a hydraulically actuated system, or a pneumatically actuated system.

In one aspect of the disclosure, the residue distribution system may include a slope sensor. The slope sensor may be arranged to detect data related to a slope angle of a ground surface. The slope angle is an angle formed between the ground surface and a horizontal plane in a direction perpendicular to the longitudinal axis. The slope sensor may include one or more components, and may be mounted directly to the harvester implement, may be located remotely from the harvester implement, or may include some components located remotely from the harvester implement and additional components mounted on the harvester implement.

In one implementation of the disclosure, the slope sensor may include, but is not limited to, a roll angle sensor. The roll angle sensor may be coupled to the housing and operable to detect a roll angle of the housing relative to the horizontal plane. In other implementations of the disclosure, the slope sensor may include a Global Positioning System (GPS) sensor operable to detect a location of the housing on the ground surface, and topographic data or map related to an elevation profile of the ground surface in a region surrounding the location of the housing. A controller or other computing device may then use the GPS location of the housing and the elevation profile to determine the slope angle of the ground surface in the region surrounding the harvester implement.

In one aspect of the disclosure, the residue distribution system may include a controller. The controller may be disposed in communication with the slope sensor and the fin actuator. The controller may include a processor and a memory having a distribution algorithm stored thereon. The processor is operable to execute the distribution algorithm to control the fin(s) between the first position and the second position based on the slope angle detected by the slope sensor.

In one aspect of the disclosure, the residue distribution system may include a weather sensor. The weather sensor may be arranged to detect data related to a wind vector. The wind vector includes a wind velocity relative to the harvester implement and/or the housing, and a wind direction relative to the longitudinal axis of the harvester implement. The weather sensor may include one or more components, and may be mounted directly to the harvester implement, may be located remotely from the harvester implement, or may include some components located remotely from the harvester implement and additional components mounted on the harvester implement.

In one aspect of the disclosure, the controller may be disposed in communication with the weather sensor and the fin actuator. The controller includes the processor and the memory having the distribution algorithm stored thereon. The processor may be operable to execute the distribution algorithm to control the fin(s) between the first position and the second position based on the wind vector, i.e., the wind direction relative to the longitudinal axis of the harvester implement and the wind velocity relative to the housing.

In one aspect of the disclosure, the residue distribution system may further include a chopper. The chopper is configured to cut the crop residue into smaller pieces. The chopper is positioned within the flow channel, between the residue distributor and the spreader, such that the residue distributor is positioned upstream of the chopper. Accordingly, the residue distributor may direct the flow of the crop residue to either the first lateral side or the second lateral side upstream of the chopper and the spreader.

In one implementation of the disclosure, the residue distributor may include an air system positioned to discharge a flow of pressurized air into the flow channel. The air system is selectively controllable between a first configuration and a second configuration. When disposed in the first configuration, the air system is configured to direct the flow of the crop residue toward the first lateral side of the flow channel. When dispose din the second configuration, the air system is configured to direct the flow of the crop residue toward the second lateral side of the flow channel.

In one implementation, the residue distributor may include a conveyor system. The conveyor system may be positioned within the flow channel and operable to move in a first lateral direction or a second lateral direction relative to the longitudinal axis. The conveyor system may move in the first lateral direction relative to the longitudinal axis to direct the flow of the crop residue toward the first lateral side of the flow channel. The conveyor system may move in the second lateral direction relative to the longitudinal axis to direct the flow of the crop residue toward the second lateral side of the flow channel. The conveyor system may include, but is not limited to, and endless belt rotating in a transverse direction relative to the longitudinal axis, and having a plurality of flights for engaging and directing the flow of the crop residue.

In one aspect of the disclosure, the residue distributor may include the controller being disposed in communication with a crop separator of the harvesting implement. The crop separator may be configured to separate grains from straw, with the straw forming the crop residue. The controller may be configured to control a speed of the crop separator to direct the flow of the crop residue toward one of the first lateral side or the second lateral side of the flow channel.

A harvester implement for harvesting a crop is also provided. The harvester implement includes a frame extending along a longitudinal axis. The longitudinal axis extends between a forward end and a rearward end of the frame relative to a direction of travel of the harvester implement. A harvester head is coupled to the frame. The harvester head is operable to reap the crop. A separator is attached to the frame. The separator is positioned to receive the crop from the harvester head. The separator is operable to separate the crop material into a grain portion and a crop residue. The harvester implement further includes a housing. The housing defines a flow channel extending along the longitudinal axis. The flow channel is positioned to receive a flow of the crop residue from the separator. The flow channel is configured for conducting the flow of the crop residue through the flow channel in a direction moving from an upstream end of the flow channel proximate the separator toward a downstream end of the flow channel. The flow channel includes a first lateral side disposed on a first side of the longitudinal axis, and a second lateral side disposed on a second side of the longitudinal axis. A spreader is positioned proximate the downstream end of the flow channel. The spreader is operable to broadcast the flow of the crop residue across a residue distribution width. The residue distribution width extends perpendicular to the longitudinal axis. A residue distributor is positioned within the flow channel and upstream of the spreader. The residue distributor is operable to direct the flow of the crop residue toward one of the first lateral side and the second lateral side of the flow channel to increase a mass flow rate of the crop residue passing through the spreader on the one of the first lateral side and the second lateral side of the flow channel, whereby a discharge density of the flow of the crop residue on the one of the first lateral side and the second lateral side is increased.

Increasing the discharge density of the flow of the crop residue decreases a deceleration rate of the crop residue, enabling the crop residue to travel through the air farther over a given time. By increasing the discharge density of the flow of crop residue, the effects of a crosswind or an uphill ground slope may be counter-acted, thereby enabling an even distribution of the crop residue over the entire residue distribution width. In other words, when a crosswind or an uphill ground slop are encountered, the residue distributor may be controlled to direct the flow of the crop residue to one of the first lateral side or the second lateral side of the flow channel, thereby increasing the discharge density on that side of the flow channel. Increasing the discharge density on that side of the harvester implement allows the crop residue to travel a greater distance through the air than would occur at a lower discharge density, thereby counteracting effects of the crosswind or an uphill ground slope.

In one aspect of the disclosure, the harvester implement may include a controller. The controller may include a processor and a memory having a distribution algorithm stored thereon. The processor is operable to execute the distribution algorithm to control the residue distributor between a first position and a second position. When the residue distributor is controlled to the first position, the residue distributor is operable to direct the flow of the crop residue toward the first lateral side of the flow channel. When the residue distributor is controlled to the second position, the residue distributor is operable to direct the flow of the crop residue toward the second lateral side of the flow channel.

In one aspect of the disclosure, the harvester implement may include a slope sensor. The slope sensor may be arranged to detect data related to a slope angle of a ground surface. The slope angle is an angle formed between the ground surface and a horizontal plane in a direction perpendicular to the longitudinal axis. The processor may be operable to execute the distribution algorithm to control the residue distributor between the first position and the second position based on the slope angle detected by the slope sensor. For example, the processor may control the residue distributor to an uphill one of the first lateral side or the second lateral side relative to the slope angle to counteract the effects of gravity acting on the broadcast crop residue.

In one aspect of the disclosure, the harvester implement may include weather sensor. The weather sensor may be arranged to detect data related to a wind vector. The wind vector may include a wind velocity relative to the housing, and a wind direction relative to the longitudinal axis. The processor may be operable to execute the distribution algorithm to control the residue distributor between the first position and the second position based on the wind vector, e.g., the wind direction relative to the longitudinal axis and the wind velocity relative to the housing. For example, the processor may control the residue distributor to an up-wind one of the first lateral side and the second lateral side of the flow channel relative to the wind vector to counter-act a crosswind acting on the broadcast crop residue.

In one implementation of the disclosure, the residue distributor may include at least one fin selectively controllable between the first position operable to direct the flow of the crop residue toward the first lateral side of the flow channel, and the second position operable to direct the flow of the crop residue toward the second lateral side of the flow channel. In one implementation, the at least one fin includes a plurality of fins arranged across a width of the flow channel transverse to the longitudinal axis. The residue distributor may further include a fin actuator coupled to the fin(s). The fin actuator is operable to move the fin(s) between the first position and the second position.

In one implementation of the disclosure, the harvester implement may include a chopper. The chopper may be operable to cut the crop residue into smaller pieces. The chopper is positioned within the flow channel, between the residue distributor and the spreader. As such, the residue distributor is positioned upstream of the chopper.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Figure 1:
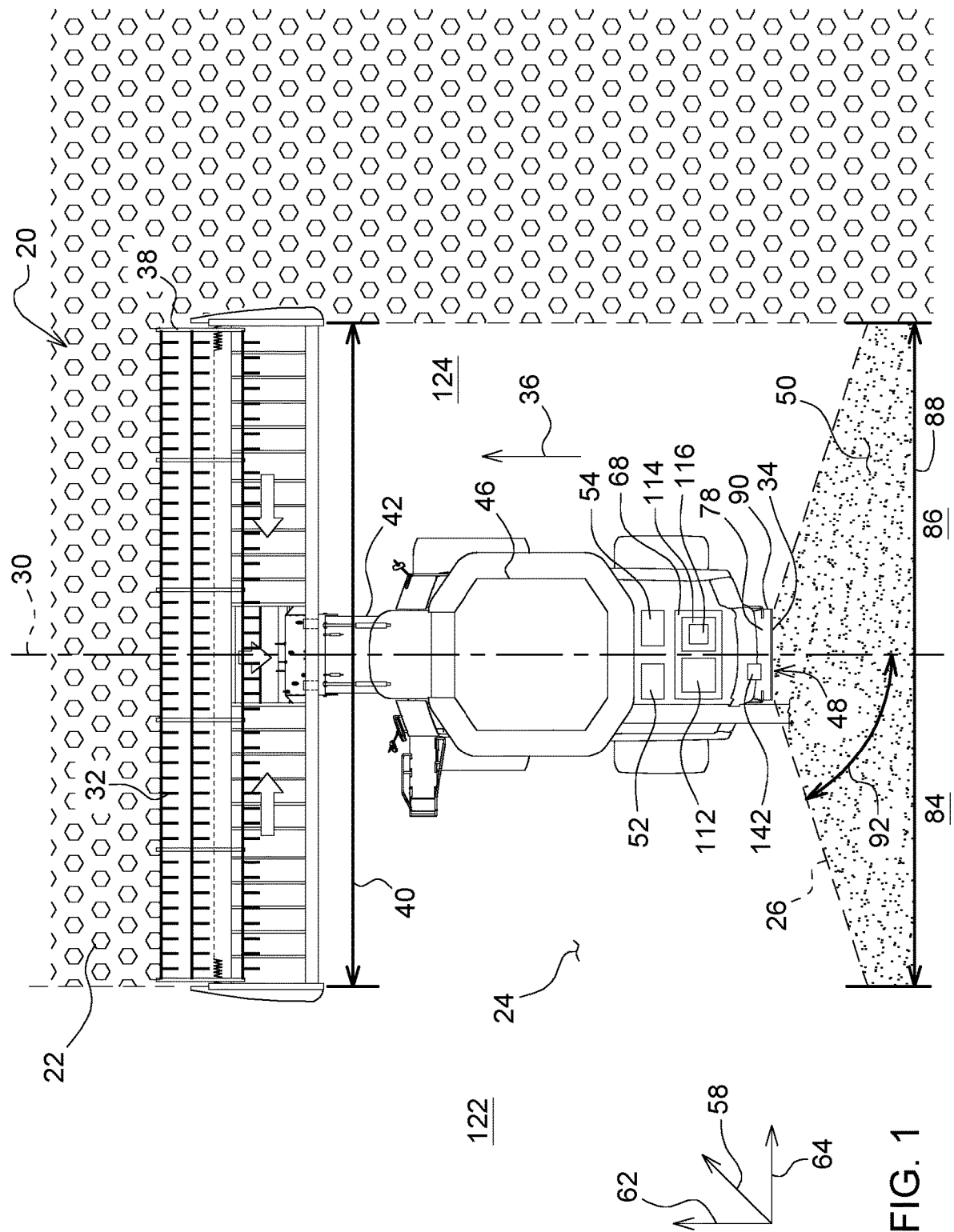
FIG. 1 is a schematic plan view of a harvester implement in a field showing a wind vector relative to the harvester implement.

Referring to the Figures, wherein like numerals indicate like parts throughout the several views, a harvester implement is generally shown at 20. Referring to FIG. 1, the harvester implement 20 is configured for harvesting a crop 22 from a field 24. The crop 22 may include, but is not limited to flax, corn, sunflowers, soybeans, sorghum, wheat canola, barley, pulses, oats, rye, etc. The harvester implement 20 may be configured to separate the grains, kernels, and/or beans from a residual crop 22 material. The residual crop 22 material may include straw, stalks and/or chaff, and may be referred to herein as a crop residue 26. The example implementation of the harvester implement 20 shown in the Figures and described herein may be referred to as a "combine harvester" or a "combine". However, it should be appreciated that the harvester implement 20 may be configured and/or named differently than the example implementation described herein.

Figure 2:
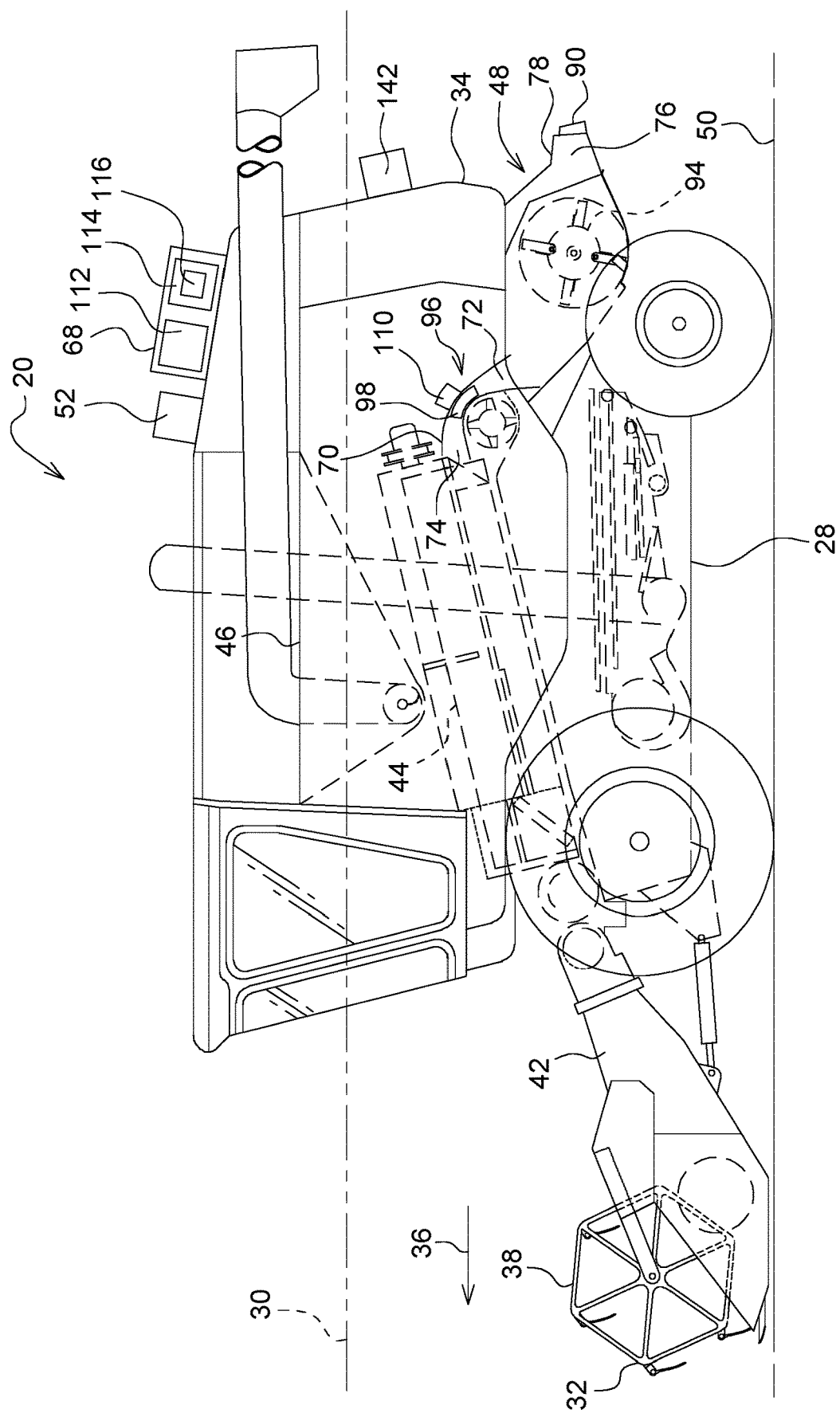
FIG. 2 is a schematic side profile view of the harvester implement.

Referring to FIG. 2, the harvester implement 20 includes a frame 28, which supports that various components of the harvester implement 20. The frame 28 may include various structural components, such as but not limited to rails, braces, brackets, walls, panels, etc. The frame 28 may be shaped and/or configured in a suitable manner for the particular application of the harvester implement 20. The frame 28 extends along a longitudinal axis 30, between a forward end 32 and a rearward end 34. The forward end 32 and the rearward end 34 of the frame 28 are defined relative to a direction of travel 36 of the harvester implement 20 while harvesting the crop 22. The longitudinal axis 30 may be defined by an axis that passes through a center of gravity of the harvester implement 20 in a long direction of the frame 28, between the forward end 32 and the rearward end 34 of the harvester implement 20.

A harvester head 38 is coupled to the frame 28 adjacent the forward end 32 of the frame 28. The harvester head 38 is configured to reap the crop 22 from the field 24. As such, the harvester head 38 may cut crop 22 and move the crop 22 rearward through the harvester implement 20 for further processing, as described briefly below. The harvester head 38 is configured to cut the crop 22 across a harvest width 40. The harvest width 40 extends a distance perpendicular to the longitudinal axis 30 of the frame 28, and may vary between applications. The features, components and operation of the harvester head 38 are dependent upon the specific crop 22 being harvested, are known to those skilled in the art, are not pertinent to the teachings of this disclosure, and are therefore not described in greater detail herein.

The harvester implement 20 may include a feeder house 42 that is attached to the frame 28. The feeder house 42 is positioned rearward of the harvester head 38 along the longitudinal axis 30, in a position to receive the crop 22 from the harvester head 38. The feeder house 42 may include a device capable of receiving the crop 22 from the harvester head 38 and moving the crop 22 rearward relative to the longitudinal axis 30. The features, components and operation of the feeder house 42 are known to those skilled in the art, are not pertinent to the teachings of this disclosure, and are therefore not described in greater detail herein.

The feeder house 42 directs the crop 22 rearward to a separator 44. The separator 44 is attached to the frame 28 and is positioned to receive the crop 22 from the feeder house 42 and/or harvester head 38. The separator 44 is operable to separate the grains, kernels, and/or beans of the crop 22 from the crop residue 26. The grains, kernels and/or beans of the crop 22 may be collected in a grain tank 46 or otherwise unloaded onto a grain cart (not shown). The crop residue 26 is discharged from the separator 44 and conveyed to a residue distribution system 48. The features, components and operation of the separator 44 are known to those skilled in the art, are not pertinent to the teachings of this disclosure, and are therefore not described in greater detail herein.

The residue distribution system 48 is positioned to receive the crop residue 26 from the separator 44 and broadcast the crop residue 26 onto a ground surface 50 of the field 24. Generally, the crop 22 and the crop residue 26 moves through the harvester implement 20 along a flow path from the harvester head 38 toward the rearward end 34 of the harvester implement 20. This movement defines a flow or stream of the crop 22 and the crop residue 26 in a general direction rearward through the harvester implement 20. As used herein, the term "upstream" is a relative descriptor referring to a direction or position located nearer the forward end 32 of the frame 28 and/or the beginning of the flow or stream of the crop 22 and/or crop residue 26. As used herein, the term "downstream" is a relative descriptor referring to a direction or position located nearer the rearward end 34 of the frame 28 and/or a location of the harvester implement 20 from which the crop residue 26 is broadcast from the harvester implement 20 onto the ground surface 50 of the field 24.

Figure 3:
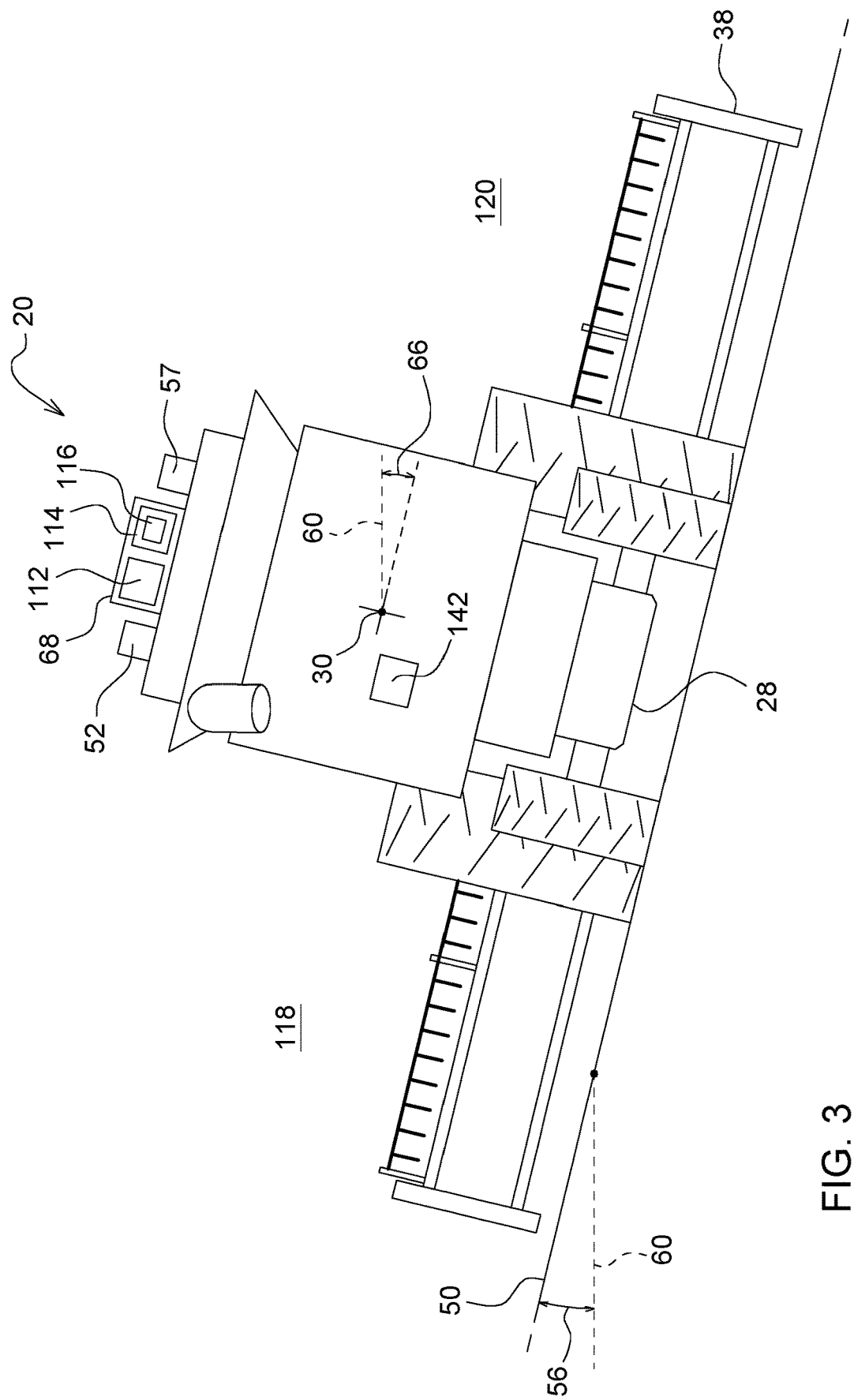
FIG. 3 is a schematic rear profile view of the harvester implement showing a ground slope relative to the harvester implement.

The residue distribution system 48 may include at least one sensor 52, 54, 142. The sensor may include, but is not limited to, a slope sensor 52, a weather sensor 54, and/or a residue distribution sensor 142. The sensor 52, 54, 142 may be arranged and/or positioned to detect data related to one of a slope angle 56, a wind vector 58, or a distribution of the crop residue (26). Referring to FIG. 3, the slope angle 56 is an angle formed between the ground surface 50 and a horizontal plane 60 in a direction perpendicular to the longitudinal axis 30 in the region of the ground surface 50 adjacent the rearward end 34 of the frame 28. The slope angle 56 may be considered the ground slope in a direction perpendicular to the longitudinal axis 30 of the frame 28. Referring to FIG. 1, the wind vector 58 includes a wind velocity and a wind direction. The wind velocity of the wind vector 58 is the wind speed measured relative to the harvester implement 20, e.g., a housing 70 of the harvester implement 20, which is described in greater detail below. The wind direction of the wind vector 58 is measured horizontally relative to the longitudinal axis 30 of the frame 28. The wind vector 58 may include a longitudinal component 62 parallel with the longitudinal axis 30, and a transverse component 64 perpendicular to the longitudinal axis 30. As used herein, reference to the wind velocity and/or the wind direction refers to the transverse component 64 of the wind vector 58 unless otherwise noted.

As noted above, the residue distribution system 48 may include the slope sensor 52. The slope sensor 52 may be positioned and/or arranged to detect data related to the slope angle 56 of the ground surface 50 relative to harvester implement 20. For example, in one implementation, the slope sensor 52 may include a roll angle sensor coupled to the frame 28, the housing 70, or some other component of the harvester implement 20. Referring to FIG. 3, the roll angle sensor may be configured to detect data related to a roll angle 66 of the frame 28, the housing 70, etc., relative to the horizontal plane 60. It should be appreciated that the roll angle 66 is an angle of rotation of the harvester implement 20 about the longitudinal axis 30. When the harvester implement 20 is directly supported or resting on the ground surface 50, the roll angle 66 of the harvester implement 20 is directly related to the slope angle 56 of the ground surface 50.

In another implementation, the slope sensor 52 may include a Global Positioning System (GPS) sensor that is operable to detect a geographic location of the frame 28, the housing 70, or some other component of the harvester implement 20 on the ground surface 50. This detected location may be compared to topographic map or data related to an elevation profile of the ground surface 50 in a region surrounding the location of the housing 70. The controller 68 may use the detected location of the harvester implement 20, a direction of travel of the harvester implement, and elevation profile from the topographic map to determine the slope angle 56 of the ground surface 50.

The slope sensor 52 may be located on the harvester implement 20, may be located remote from the harvester implement 20, or may include multiple components, with one component located on the harvester implement 20 and another component located remote from the harvester implement 20. The slope sensor 52, and any components thereof, may be disposed in communication with a controller 68, described in greater detail below, for communicating the data related to the slope angle 56 thereto.

As noted above, the residue distribution system 48 may include the weather sensor 54. As shown in FIG. 1, the weather sensor 54 may be positioned and/or arranged to detect data related to the wind vector 58, e.g., the wind velocity relative to the harvester implement 20 and/or the wind direction relative to the longitudinal axis 30. In one implementation, the weather sensor 54 may include a weather station. The weather station may be located on the harvester implement 20, or may be located remotely from the harvester implement 20 and disposed in communication with the controller 68 for communicating the data related to the wind vector 58. For example, the weather station may be positioned near the harvester implement 20, such as but not limited to a field 24 the harvester implement 20 is working. In another implementation, the weather sensor 54 may include a communication link with a remote weather service that is configured for communication data related to the wind vector 58 to the controller 68 of the harvester implement 20.

As noted above, the residue distribution system 48 may include the residue distribution sensor 142. As shown in FIG. 1, the residue distribution sensor 142 may be positioned and/or arranged to detect data related to distribution of the crop residue 26 in a direction perpendicular to the longitudinal axis 30. As used herein, the term "distribution" of the crop residue 26 may include, but is not limited to, a width left and/or right of the longitudinal axis 30 over which the crop residue 26 is spread, broadcast or distributed. When combined with movement of the harvester implement 20 in the direction of travel 36, the term "distribution" of the crop residue may include, but is not limited to, an area over which the crop residue 26 is broadcast or spread, i.e., the width left and/or right of the longitudinal axis 30 over a length of movement along the direction of travel 36. Additionally, the term "distribution" of the crop residue may include a relative quantity or amount of material aspect, e.g., a density, mass, or volume of the crop residue.

In one implementation, the residue distribution sensor 142 includes a camera operable to detect an image of the crop residue 26 either dispersed on the field, while moving through the air, or while moving through the harvester implement 20. For example, in one implementation, the residue distribution sensor 142 may be positioned and configured to capture an image of the crop residue 26 disposed on the field. In other implementations, the residue distribution sensor 142 may capture an image of the crop residue 26 while the crop residue 26 is moving through the air, after being broadcast from the spreader 78 and prior to contacting the ground. In other implementations, the residue distribution sensor 142 may capture an image of the crop residue 26 while the crop residue 26 is moving through the harvester implement, e.g., through the flow channel 72. The controller may analyze the image to determine the distribution of the crop residue 26 on either side, i.e., left or right, of the longitudinal axis 30. The controller 68 may then control the residue distributor 96 based on the detected distribution of the crop residue 26 perpendicular to the longitudinal axis 30. While the residue distribution sensor 142 has been described herein as a camera operable to capture an image, it should be appreciated that the residue distribution sensor 142 may include some other type and/or configuration of sensor operable to sense data other than an image, such as but not limited to a weight, a force, a reflected light wave, a reflected radio wave, a reflected sound waves, etc. For example, other implementations of the residue distribution sensor 142 may alternatively be configured as, but are not limited to, a radar sensor, a lidar sensor, a thermal sensor, and IR light sensor/camera, or some other similar sensing device. It should be appreciated that the residue distribution sensor 142 may include some other device for sensing other types of data related to the distribution of the crop residue 26 other than the examples described herein.

As noted above, with reference to FIG. 2, the harvester implement 20 includes the housing 70. The housing 70 defines a flow channel 72 that extends along the longitudinal axis 30. The housing 70 may include, but is not limited to, interior and/or exterior panels, wall members, supports, braces, the frame 28, etc. It should be appreciated that the housing 70 may include and/or define other portions of the harvester implement 20 other than the flow channel 72. The flow channel 72 is configured for conducting the flow of the crop residue 26 therethrough in a direction moving from an upstream end 74 of the flow channel 72 toward a downstream end 76 of the flow channel 72. The upstream end 74 of the flow channel 72 is positioned to receive the crop residue 26 from the separator 44. The downstream end 76 of the flow channel 72 is positioned proximate a spreader 78, and directs the crop residue 26 to the spreader 78. The flow channel 72 may be formed by one or more components positioned to form a boundary for guiding the crop residue 26 between the separator 44 and the spreader 78. The flow channel 72 may be formed by one or more components of the housing 70 including, but not limited to walls, panels, plates, belts, etc. It should be appreciated that the flow channel 72 may further be defined by other components and/or features of the harvester implement 20, other than the housing 70.

Figure 4:
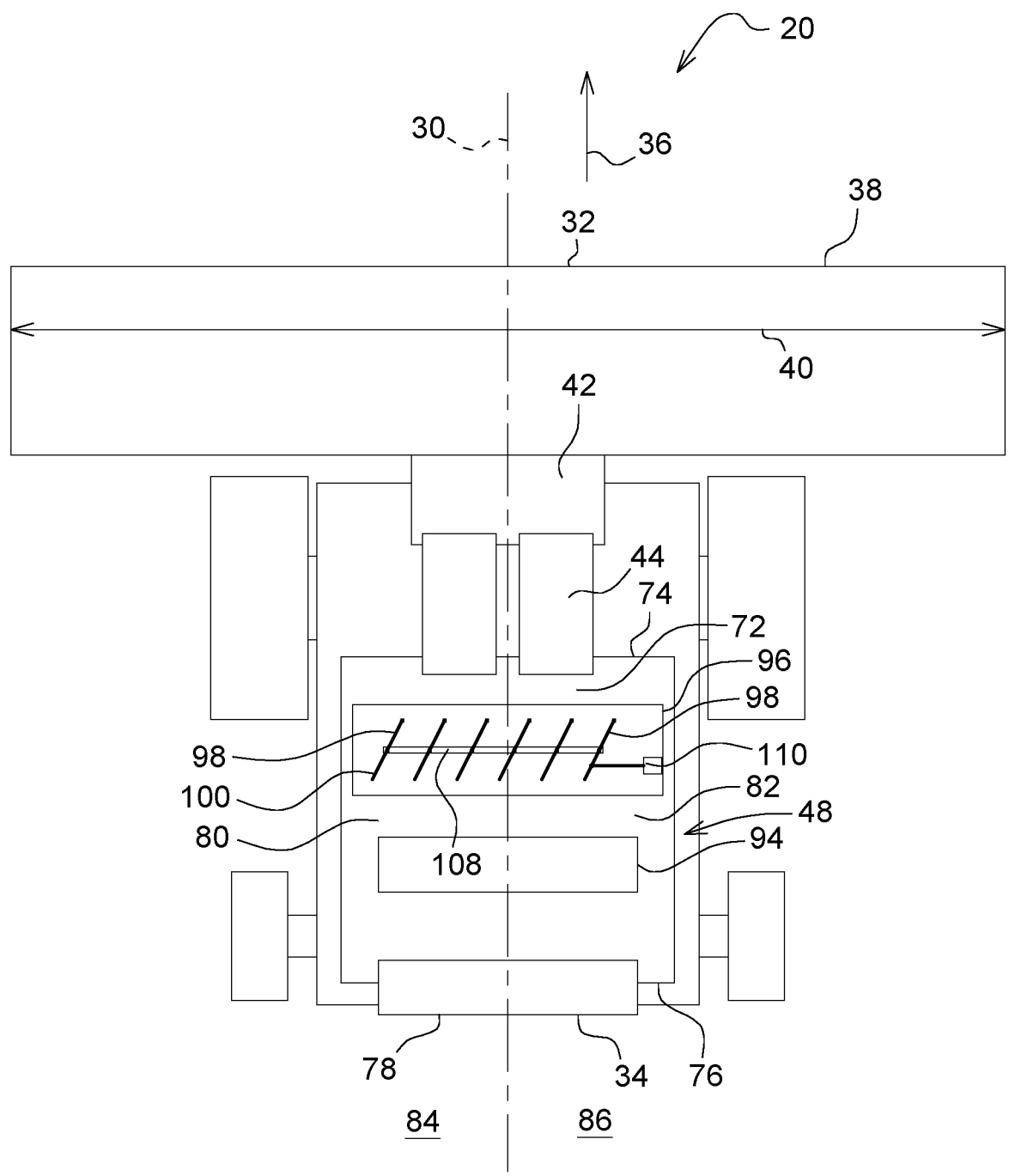
FIG. 4 is a schematic plan view of the harvester implement showing a residue distributor in a first position.
Figure 5:
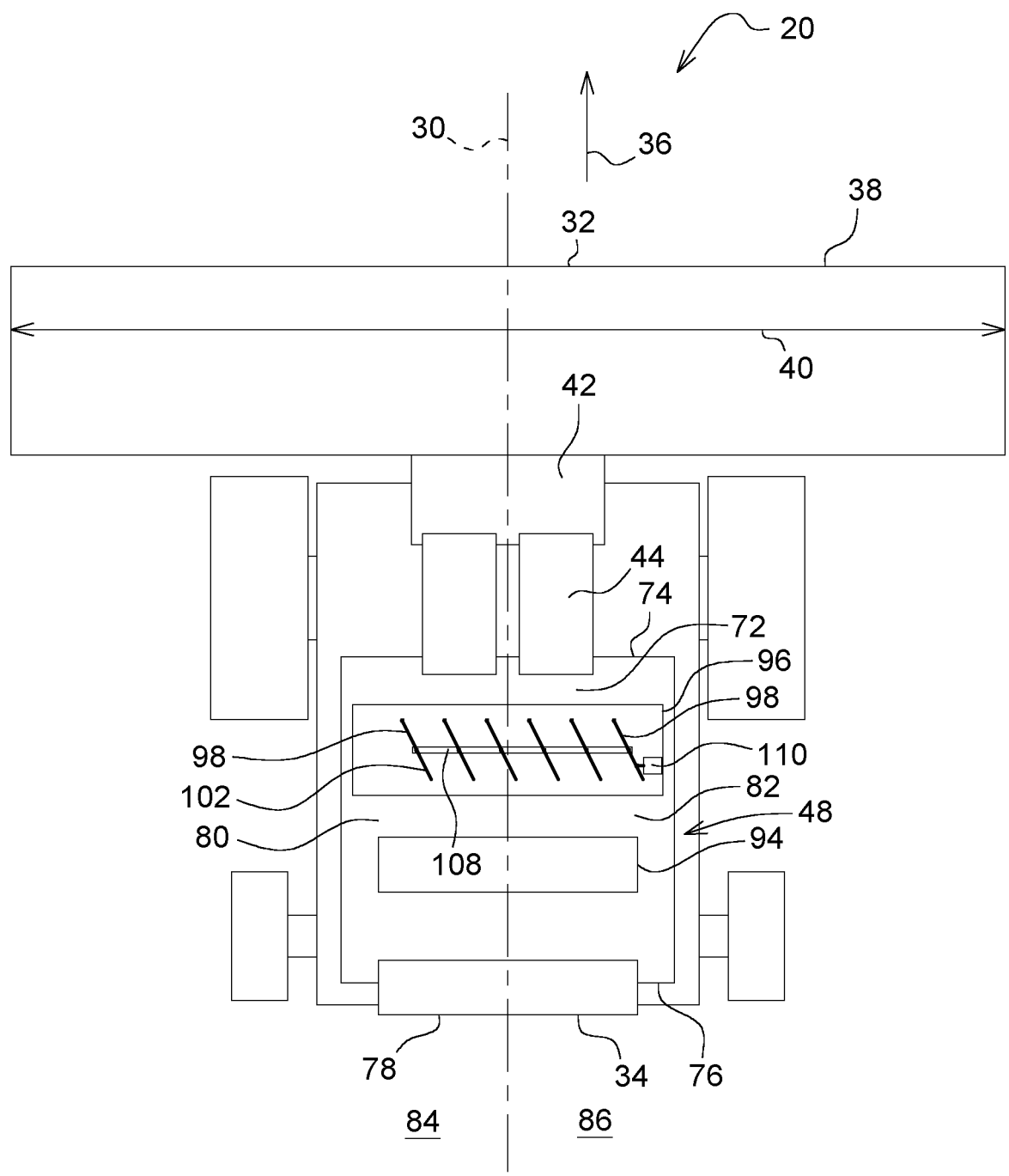
FIG. 5 is a schematic plan view of the harvester implement showing the residue distributor in a second position.
Figure 6:
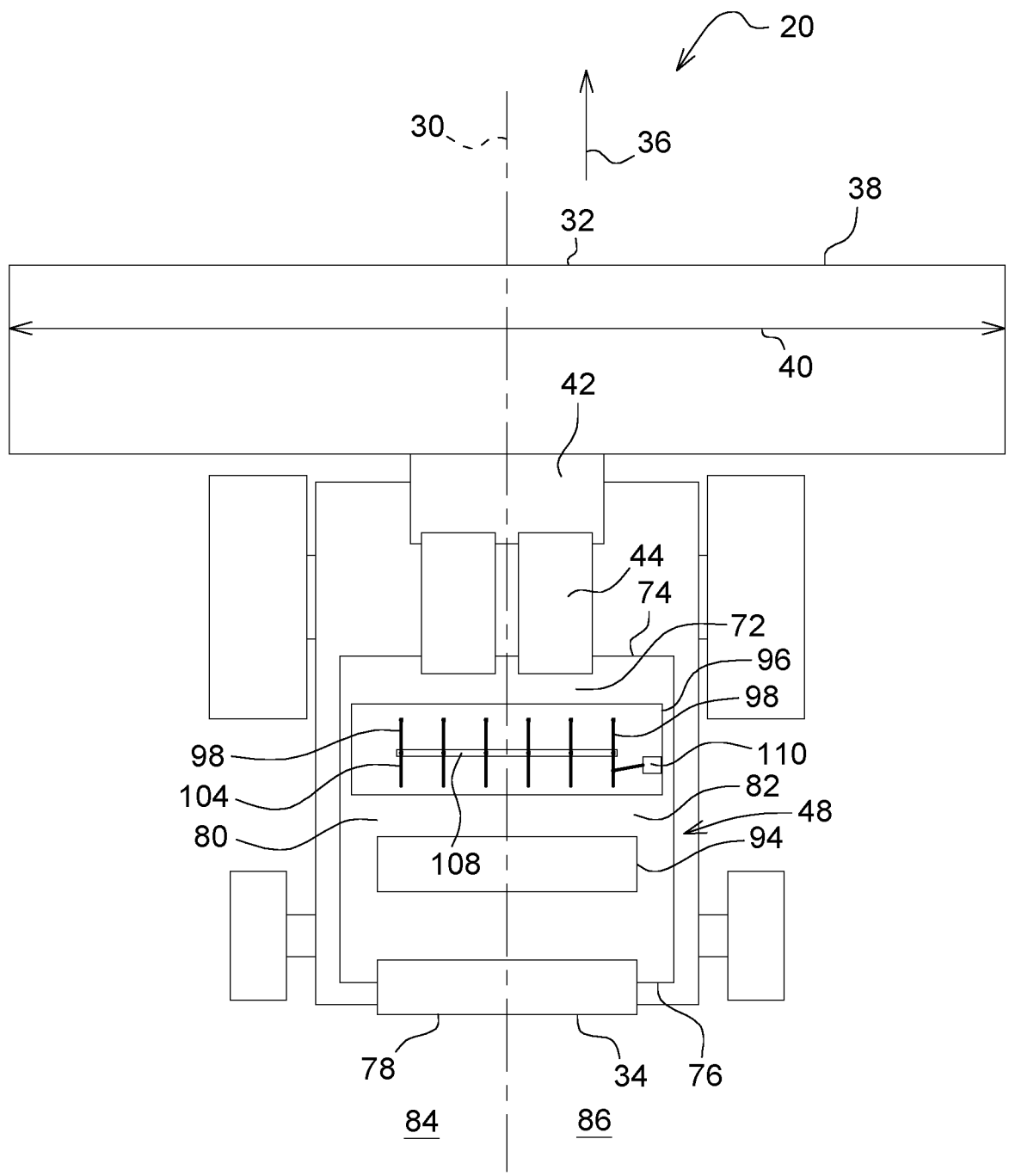
FIG. 6 is a schematic plan view of the harvester implement showing the residue distributor in an intermediate position.

Referring to FIGS. 4-6, the flow channel 72 generally extends along the longitudinal axis 30, and includes a first lateral side 80 and a second lateral side 82. The first lateral side 80 and the second lateral side 82 are disposed on opposing sides of the flow channel 72, e.g., left and right sides respectively. In one implementation, the flow channel 72 is generally longitudinally centered with the longitudinal axis 30, such that the first lateral side 80 of the flow channel 72 is disposed on a first side 84 of the longitudinal axis 30, and the second lateral side 82 of the flow channel 72 is disposed on a second side 86 of the longitudinal axis 30.

As described above, the spreader 78 is positioned proximate the downstream end 76 of the flow channel 72. Referring to FIG. 1, the spreader 78 is operable to broadcast the flow of the crop residue 26 onto the field 24, across a residue distribution width 88. The spreader 78 may include any device that is capable of spreading or broadcasting the crop residue 26 onto the field 24. For example, the spreader 78 may include, but is not limited to, one or more of a spinner, active shrouds, and/or moveable vanes. In the example implementation shown in the Figures, the spreader 78 includes one or more adjustable guide vanes 90. However, it should be appreciated that the spreader 78 may be configured differently in other implementations. The features, components, and operation of the spreader 78 are known to those skilled in the art, are not pertinent to the teachings of this disclosure, and are therefore not described in greater detail herein.

The residue distribution width 88 is a distance extending perpendicular to the longitudinal axis 30. In one implementation, the residue distribution width 88 is approximately equal to the harvest width 40 of the harvester head 38. In the example implementation described herein, the adjustable guide vanes 90 are operable to control a distribution or broadcast angle 92 of the crop residue 26. A position of the guide vanes 90 may be controlled via a respective actuator to direct the flow of the crop residue 26 relative to the longitudinal axis 30 to broadcast the crop residue 26 across the residue distribution width 88. For example, the guide vanes 90 may be positioned to direct the crop residue 26 at a larger angle relative to the longitudinal axis 30 to direct the crop residue 26 farther from the longitudinal axis 30, or may be positioned to direct the crop residue 26 at a lesser angle relative to the longitudinal axis 30 to direct the crop residue 26 nearer the longitudinal axis 30. The position of the guide vanes 90 may be controlled by the controller 68.

Referring to FIG. 2, the residue distribution system 48 may further include a chopper 94. The chopper 94 is operable to further cut and/or chop the crop residue 26 into smaller segments and/or portions. The chopper 94 may be positioned within the flow channel 72 between the residue distributor 96 and the spreader 78, such that the residue distributor 96 is positioned upstream of the chopper 94 and downstream of the separator 44. As such, the chopper 94 may be positioned to receive the flow of the crop residue 26 from the separator 44 via the flow channel 72, and then discharge the flow of the crop residue 26 back into the flow channel 72 upstream of the spreader 78. The spreader 78 may then receive the flow of the crop residue 26 from the chopper 94 via the flow channel 72. The features, components and operation of the spreader 78 are known to those skilled in the art, are not pertinent to the teachings of this disclosure, and are therefore not described in greater detail herein.

Referring to FIG. 1, with no or very light wind acting on the crop residue 26 broadcast from the spreader 78, and when being broadcast onto flat terrain, the spreader 78 evenly distributes the crop residue 26 across the residue distribution width 88. However, cross winds, i.e., winds blowing transverse to the longitudinal axis 30, may blow the broadcast crop residue 26 toward a downwind side 124 of the harvester implement 20, thereby preventing the broadcast crop residue 26 distributed in the upwind direction from fully spreading across the residue distribution width 88 and blowing the crop residue 26 broadcast in the downwind direction beyond the residue distribution width 88.

Referring to FIG. 3, when the harvester implement 20 is traversing across a side slope of the ground surface 50, i.e., moving perpendicular to the slope angle 56 of the ground surface 50, the crop residue 26 broadcast on an uphill side 118 of the harvester implement 20 will have a shorter or lesser drop distance than the crop residue 26 broadcast on a downhill side 120 of the harvester implement 20. The drop distance may be defined as the vertical distance traveled by the crop residue 26 from the spreader 78 to the ground surface 50. The reduced drop distance on the uphill side 118 of the harvester implement 20, caused by the slope angle 56 of the ground surface 50, will cause the crop residue 26 to contact the ground surface 50 sooner than the crop residue 26 broadcast on the downhill side 120 of the harvester implement 20, which has an increased drop distance caused by the ground surface 50. By reducing the time it takes for the crop residue 26 to contact the ground surface 50 on the uphill side 118 of the harvester implement 20, the crop residue 26 spends less time traveling through the air, and therefore travels a shorter lateral distance from the spreader 78. This may result in the crop residue 26 broadcast on the uphill side 118 of the harvester implement 20 failing to fully spread across the residue distribution width 88 on the uphill side 118 of the harvester implement 20. In contrast, the increased drop distance on the downhill side 120 of the harvester implement 20 increases the time the crop 22 material takes to contact the ground surface 50, thereby enabling the crop residue 26 broadcast on the downhill side 120 of the harvester implement 20 to travel farther, which increases the lateral distribution distance from the spreader 78 and potentially distributing the crop residue 26 on the downhill side 120 of the harvester implement 20 outside the residue distribution width 88.

While the guide vanes 90 of the spreader 78 may be employed to counter act the effects of a crosswind and/or the effects of the slope angle 56 on the distribution of the crop residue 26, by changing the trajectory of the crop residue 26 from the spreader 78 relative to the longitudinal axis 30, the guide vanes 90 do not affect deceleration of the crop residue 26 due to air resistance, i.e., movement through the air. The deceleration of the crop residue 26 due to air resistance is increased on the upwind side 122 of a cross wind due to the relative air speed of the crop residue 26 on the upwind side 122 of the harvester implement 20.

The flow of the crop residue 26 is comprised of many very small and light individual pieces. Due to their respective small weight or mass, each individual piece of the crop residue 26 carries very little momentum, and therefore decelerates rapidly due to air resistance when moving against the cross wind. However, when the individual pieces of the crop residue 26 are "grouped" together, the effect of air resistance on the group of crop residue 26 is lessened. In other words, the increased weight or mass of the group or flow of the crop residue 26 carries more momentum through the air, thereby decreasing the effect of air resistance on the crop residue 26. In other words, when the crop residue 26 moves through the air in a tightly packed group of small pieces, the effects of air resistance on the group is lessened, thereby allowing the crop residue 26 to resist the effects of air resistance and slowing the deceleration of the crop residue 26. Slowing the deceleration of the crop residue 26 enables the crop residue 26 to travel farther in a given amount of time.

Referring to FIGS. 4-6, in order to counteract the effects of the cross wind and/or the slope angle 56 of the ground surface 50, the residue distribution system 48 may further include a residue distributor 96. The residue distributor 96 is positioned within the flow channel 72 and upstream of the spreader 78. If the residue distribution system 48 is equipped with the chopper 94, the residue distributor 96 may be positioned upstream of the chopper 94. The residue distributor 96 is operable to direct the flow of the crop residue 26 toward one of the first lateral side 80 and the second lateral side 82 of the flow channel 72. By directing the flow of the crop residue 26 toward one of the first lateral side 80 or the second lateral side 82 of the flow channel 72, a mass flow rate of the crop residue 26 passing through the spreader 78 on that side of the flow channel 72, i.e., the one of the first lateral side 80 and the second lateral side 82 of the flow channel 72, is increased. As used herein, the "mass flow rate" of the crop residue 26 is defined as the mass of the crop residue 26 passing through a specified portion of the flow channel 72 per unit of time. Increasing the mass flow rate of the crop residue 26 on that side of the flow channel 72, i.e., on the one of the first lateral side 80 or the second lateral side 82, increases a discharge density of the flow of the crop residue 26 on that side of the flow channel 72. As used herein, the "discharge density" is defined as the mass of the crop residue 26 being moved through the flow channel 72 or discharged by the spreader 78 per a unit of volume at a given time.

Accordingly, the residue distributor 96 increases a percentage of the flow of the crop residue 26 positioned within the flow channel 72 on one of the first lateral side 80 or the second lateral side 82. By increasing the percentage of the crop residue 26 on a selected one of the first lateral side 80 or the second lateral side 82, the mass of the crop residue 26 on that side increases. Increasing the mass of the crop residue 26 on the selected side of the flow channel 72 increase the density of the crop residue 26 on that side, i.e., the mass by unit volume. By directing more of the crop residue 26 to the selected side of the flow channel 72, the amount or percentage of the crop 22 material on that side of the flow channel 72 moves through the spreader 78 on that side of the flow channel 72, thereby increasing the amount or percentage of the crop residue 26 that is distributed by the spreader 78 on the selected side of the flow channel 72. This in turn increases the density of the crop residue 26 broadcast from the spreader 78. As described above, increasing the mass or density of the bunched together flow of the crop 22 material decreases deceleration of the broadcast crop 22 material moving through the air, because the larger mass and/or density of the crop residue 26 moving as a group increases the momentum of the crop residue 26, thereby allowing the crop residue 26 to travel farther in a given period of time.

Because gravity is a constant acting on the broadcast crop residue 26, the amount of time it takes to fall the drop distance is generally fixed. However, by decreasing the deceleration of the crop residue 26, thereby allowing the crop residue 26 to travel farther in the amount of time it takes the crop residue 26 to fall the drop distance, the crop residue 26 may travel farther from the longitudinal axis 30. By doing so, the effect of the cross wind and/or the slope angle 56 may be counter-acted, and the crop residue 26 evenly spread across the residue distribution width 88.

Referring to FIGS. 4-6, in one example implementation, the residue distributor 96 may include at least one vane or fin 98. The fin 98 is selectively controllable between a first position 100, shown in FIG. 4, and a second position 102, shown in FIG. 5. When the fin 98 is disposed in the first position 100, the fin 98 is operable to direct the flow of the crop residue 26 toward the first lateral side 80 of the flow channel 72. When the fin 98 is disposed in the second position 102, the fin 98 is positioned and operable to direct the flow of the crop residue 26 toward the second lateral side 82 of the flow channel 72. Additionally, the fin 98 may be selectively controllable into at least one intermediate position 104, shown in FIG. 6. The intermediate position 104 is located between the first position 100 and the second position 102. In one implementation, the intermediate position 104 may include an infinite number of positions between the first position 100 and the second position 102. In another implementation, the intermediate position 104 may include or be defined as a center position disposed equidistant from each of the first position 100 and the second position 102.

In the example implementation shown in FIGS. 4-6, the at least one fin 98 includes a plurality of fins 98. The plurality of fins 98 are arranged across a width of the flow channel 72 in a direction transverse to the longitudinal axis 30. The plurality of fins 98 may be equidistantly spaced from each other. In one implementation, the plurality of fins 98 may be coupled together with a linkage 108 to provide common movement between the first position 100, the second position 102 and/or the intermediate position 104. In other implementations, each of the plurality of fins 98 may be independently controllable and/or moveable relative to remaining plurality of fins 98. In yet other implementations, the plurality of fins 98 may be arranged in multiple groups of the fins 98, with each group controllable and moveable relative to the other groups of the fins 98. For example, the plurality of fins 98 may be arranged with a first group of fins 98 on the first half of the flow channel 72, and a second group of fins 98 on the second half of the flow channel 72. The first group may be coupled together for movement together. The second group may also be coupled together for movement together. The first group may be moveable independently of the second group.

Referring to FIGS. 4-6, the example implementation of the residue distributor 96 further includes a fin actuator 110. The fin actuator 110 is coupled to the fins 98. The fin actuator 110 is operable to move the fins 98 between the first position 100, the second position 102, and the intermediate position 104. The fin actuator 110 may include, but is not limited to, one of a linear actuator operable to extend in a first linear direction and retract in a second linear direction opposite the first linear direction, or a rotary actuator operable to rotate in a first rotational direction and a second rotational direction opposite the first rotational direction. The fin actuator 110 may include an electrically powered device, a hydraulically powered device, a pneumatically powered device. The fin actuator 110 may be coupled to the fins 98 directly, or through a drivetrain, gear system, linkage 108 system, etc.

The fin actuator 110 may be actuated via and/or responsive to a control signal from the controller 68. The control signal is dependent upon the specific configuration of the fin actuator 110. For example, if the fin actuator 110 is implemented as an electric motor, the control signal may include an electronic signal. If the fin actuator 110 is implemented as a hydraulic motor, the control signal may include a flow of a hydraulic fluid. It should be appreciated that the control signal may vary from the example implementations noted herein.

As noted above, the harvester implement 20 may include the controller 68. The controller 68 may be disposed in communication with the sensor 52, 54, 142 e.g., the slope sensor 52 and/or the weather sensor 54. Additionally, the controller 68 may be disposed in communication with the residue distributor 96 for controlling the residue distributor 96, e.g., the fin actuator 110. The controller 68 may be operable to receive data signals from the slope sensor 52 and/or the weather sensor 54, and communicate a control signal to the residue distributor 96, e.g., the fin actuator 110. While the controller 68 is generally described herein as a singular device, it should be appreciated that the controller 68 may include multiple devices linked together to share and/or communicate information therebetween. Furthermore, it should be appreciated that the controller 68 may be located on the harvester implement 20 or located remotely from the harvester implement 20.

The controller 68 may alternatively be referred to as a computing device, a computer, a control unit, a control module, a module, etc. The controller 68 includes a processor 112, a memory 114, and all software, hardware, algorithms, connections, sensors, etc., necessary to manage and control the operation of the residue distributor 96. As such, a method may be embodied as a program or algorithm operable on the controller 68. It should be appreciated that the controller 68 may include any device capable of analyzing data from various sensors, comparing data, making decisions, and executing the required tasks.

As used herein, "controller" is intended to be used consistent with how the term is used by a person of skill in the art, and refers to a computing component with processing, memory, and communication capabilities, which is utilized to execute instructions (i.e., stored on the memory or received via the communication capabilities) to control or communicate with one or more other components. In certain embodiments, the controller 68 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The controller 68 may be in communication with other components on the harvester implement 20, such as hydraulic components, electrical components, and operator inputs within an operator station of an associated work vehicle. The controller 68 may be electrically connected to these other components by a wiring harness such that messages, commands, and electrical power may be transmitted between the controller 68 and the other components. Although the controller 68 is referenced in the singular, in alternative embodiments the configuration and functionality described herein can be split across multiple devices using techniques known to a person of ordinary skill in the art.

The controller 68 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 114 may include any non-transitory/tangible medium which participates in providing data or computer-readable instructions. The memory 114 may be non-volatile or volatile. Non-volatile media may include, for example, optical or magnetic disks and other persistent memory. Example volatile media may include dynamic random access memory (DRAM), which may constitute a main memory. Other examples of embodiments for memory 114 include a floppy, flexible disk, or hard disk, magnetic tape or other magnetic medium, a CD-ROM, DVD, and/or any other optical medium, as well as other possible memory devices such as flash memory.

The controller 68 includes the tangible, non-transitory memory 114 on which are recorded computer-executable instructions, including a distribution algorithm 116. The processor 112 of the computing device is configured for executing the distribution algorithm 116. The distribution algorithm 116 implements a method of distributing the crop residue 26 from the harvester implement 20, described in detail below.

The controller 68 is configured to receive data from the sensors 52, 54, 142 related to at least one of the slope angle 56 detected by the slope sensor 52 and/or the wind vector 58, i.e., the wind direction relative to the longitudinal axis 30 and the wind velocity relative to the housing 70, detected by the weather sensor 54. It should be appreciated that the controller 68 may use one or both the slope sensor 52 and/or the weather sensor 54 to control the position of the residue distributor 96. In the example implementation described herein, the residue distribution system 48 includes both the slope sensor 52 and the weather sensor 54. However, in other implementations, the residue distribution system 48 may include only the slope sensor 52, or only the weather sensor 54.

The controller 68 may determine the slope angle 56 and the wind vector 58 from the data received from the slope sensor 52 and the weather sensor 54 respectively. Once the slope angle 56 and the wind vector 58 have been determined, the controller 68 may then determine a desired position of the residue distributor 96 based on the slope angle 56 and the wind vector 58. For example, referring to FIG. 3, the controller 68 may identify an uphill side 118 and a downhill side 120 of the harvester implement 20, and communicate the control signal to the fin actuator 110 to move the fins 98 into the one of the first position 100 or the second position 102 located on the uphill side 118 of the harvester implement 20. By so doing, the residue distributor 96 increases the discharge density on the uphill side 118 of the harvester implement 20 to counteract the effects of gravity on the broadcast crop residue 26 as described above. Alternatively, referring to FIG. 1, the controller 68 may identify an upwind side 122 and a downwind side 124 of the harvester implement 20, and communicate the control signal to the fin actuator 110 to move the fins 98 into the one of the first position 100 or the second position 102 located on the upwind side 122 of the harvester implement 20. By so doing, the residue distributor 96 increases the discharge density on the upwind side 122 of the harvester implement 20 to counteract the effects of the wind on the broadcast crop residue 26 as described above.

It should be appreciated that the uphill side 118 of the harvester implement 20 and the upwind side 122 of the harvester implement 20 may be located on the same side of the harvester implement 20, or may be located on different sides of the harvester implement 20. When the upwind side 122 and the uphill side 118 are located on the same side of the harvester implement 20, the effects of the wind vector 58 and the effects of gravity on the broadcast crop residue 26 are combined, thereby requiring a higher discharge density on that side of the harvester implement 20. However, if the upwind side 122 and the uphill side 118 of the harvester implement 20 are located on different side of the harvester implement 20, the effects of the wind vector 58 and the effects of gravity on the broadcast crop residue 26 act in opposition to each other, and the discharge density may not need to be increased significantly in order to evenly distribute the crop residue 26 over the residue distribution width 88.

It should be appreciated that the controller 68 may control the residue distributor 96 into one or more intermediate positions 104 based on a magnitude of the slope angle 56 and/or the wind vector 58. For example, the controller 68 may control the residue distributor 96 into the first position 100 when the wind vector 58 and/or the slope angle 56 are greater than a defined threshold, and position the residue distributor 96 into one or more intermediate positions 104, such as shown in FIG. 6, when the wind vector 58 and/or the slope angle 56 are greater than a minimum value but less than the defined threshold. As such, the position of the residue distributor 96 may be controlled based on a magnitude of the wind vector 58 and/or the slope angle 56.

Figure 7:
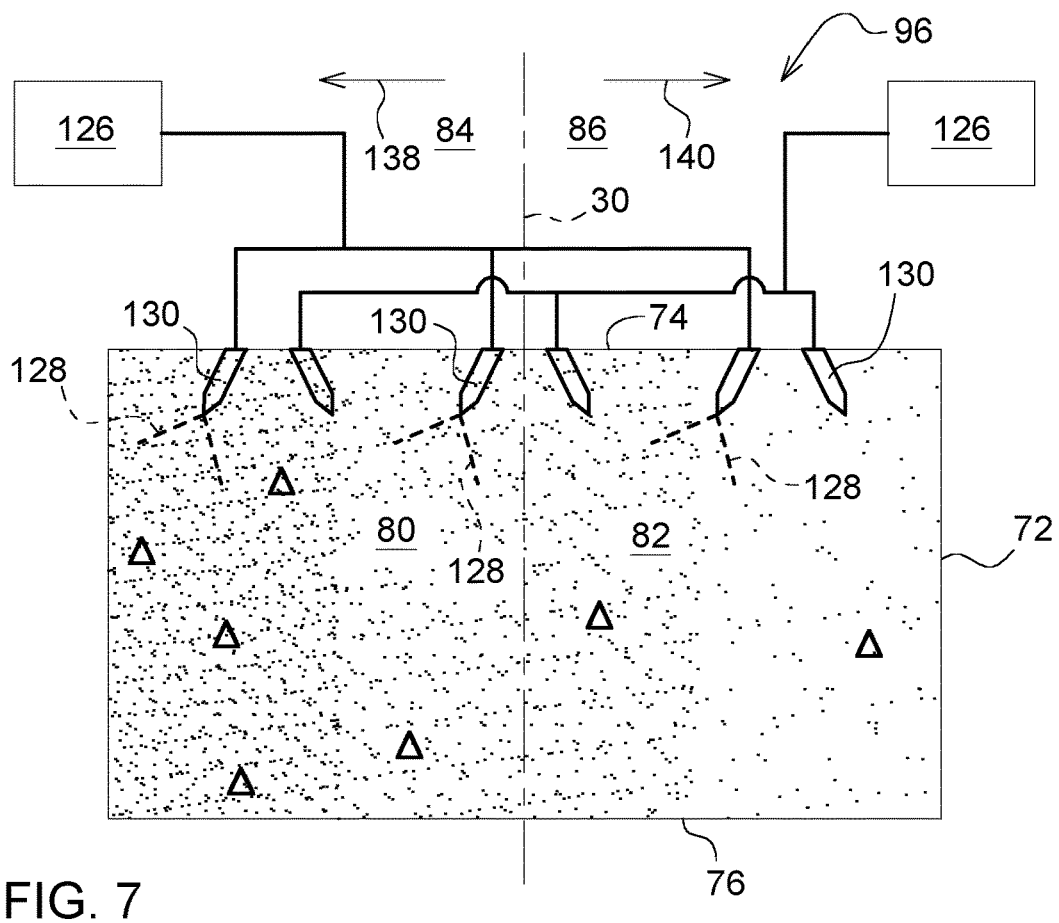
FIG. 7 is a schematic cross sectional view of the harvester implement showing a first alternative embodiment of the residue distributor.

One example implementation of the residue distributor 96 is described above and shown in FIGS. 4-6. However, it should be appreciated that the residue distributor 96 may be configured differently than the example implementation described above. For example, referring to FIG. 7, in another implementation, the residue distributor 96 may include an air system 126 positioned to discharge a flow of pressurized air 128 into the flow channel 72 through one or more nozzles 130. The air system 126 may be selectively controllable between a first configuration to direct the flow of the crop residue 26 toward the first lateral side 80 of the flow channel 72, and a second configuration to direct the flow of the crop residue 26 toward the second lateral side 82 of the flow channel 72. The air system 126 may be controlled to vary a pressure of the flow of pressurized air 128 to vary and/or control the percentage of the crop residue 26 moved laterally relative to the longitudinal axis 30, and thereby vary and/or control the discharge density.

Figure 8:
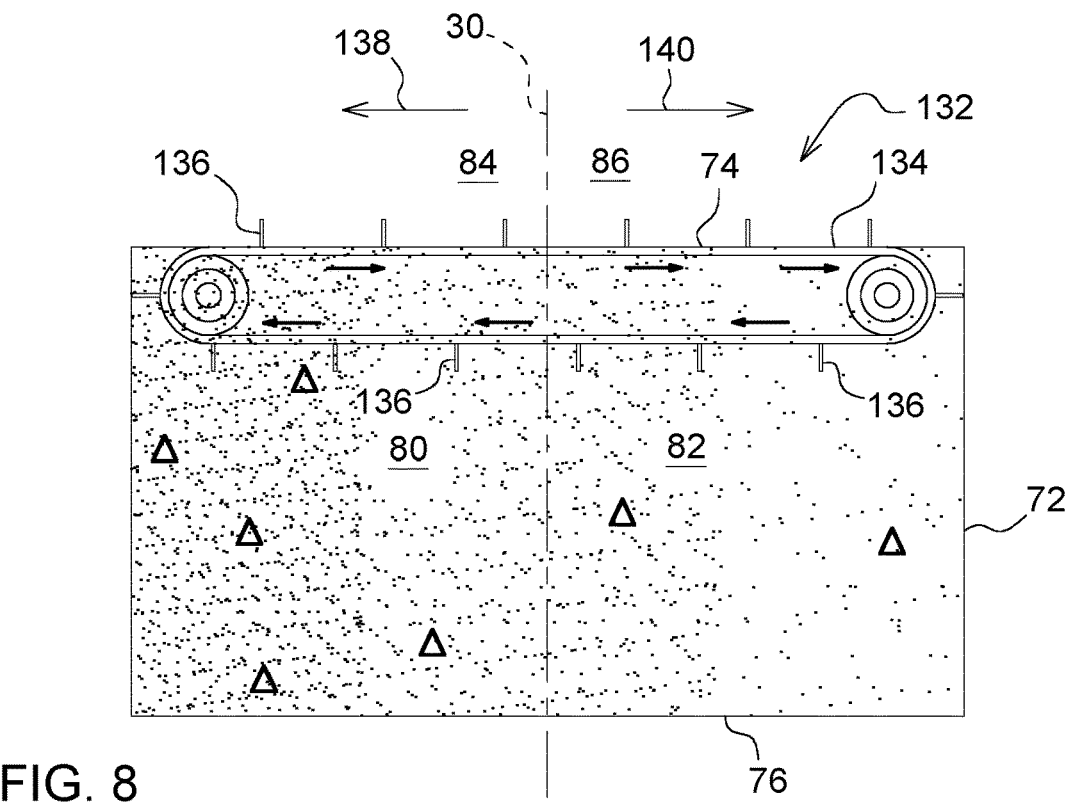
FIG. 8 is a schematic cross sectional view of the harvester implement showing a second alternative embodiment of the residue distributor.

In yet another implementation, referring to FIG. 8, the residue distributor 96 may include a conveyor system 132. The conveyor system 132 may be positioned within the flow channel 72. The conveyor system 132 may include an endless belt 134 having a plurality of flights 136 that move laterally across the flow channel 72. The conveyor system 132 may be configured to rotate or move in a first lateral direction 138 relative to the longitudinal axis 30 to direct the flow of the crop residue 26 toward the first lateral side 80 of the flow channel 72, and move in an opposite second lateral direction 140 relative to the longitudinal axis 30 to direct the flow of the crop residue 26 toward the second lateral side 82 of the flow channel 72. The conveyor system 132 may be controlled to vary a speed of the endless belt 134 to vary and/or control the percentage of the crop residue 26 moved laterally relative to the longitudinal axis 30, and thereby vary and/or control the discharge density.

In yet another implementation, the residue distributor 96 may include the controller 68 in communication with the separator 44 of the harvester implement 20. The controller 68 may be configured to control a speed of the crop 22 separator 44 to direct the flow of the crop residue 26 toward one of the first lateral side 80 or the second lateral side 82 of the flow channel 72. For example, the separator 44 may include a pair of parallel separators 44 extending along the longitudinal axis 30 and positioned on opposing sides of the flow channel 72, i.e., one separator 44 on the first lateral side 80, and a second separator 44 on the second lateral side 82. By increasing the speed of one of the separators 44, the output from the separator 44 on that side of the flow channel 72 may be increased, thereby directing the crop residue 26 toward that side of the flow channel 72.

While different implementations of the residue distributor 96 are described herein, it should be appreciated that the residue distributor 96 is not limited to any one implementation, and that the residue distributor 96 may be configured differently than the example implementations described herein.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A residue distribution system for a harvester implement, the residue distribution system comprising:
   a housing defining a flow channel extending along a longitudinal axis and configured for conducting a flow of a crop residue therethrough in a direction moving from an upstream end of the flow channel toward a downstream end of the flow channel, the flow channel having a first lateral side disposed on a first side of the longitudinal axis, and a second lateral side disposed on a second side of the longitudinal axis;
   a spreader positioned proximate the downstream end of the flow channel and operable to broadcast the flow of the crop residue across a residue distribution width extending perpendicular to the longitudinal axis;
   a residue distributor positioned within the flow channel and upstream of the spreader, wherein the residue distributor is configured to direct the flow of the crop residue toward one of the first lateral side and the second lateral side of the flow channel to increase a mass flow rate of the crop residue passing through the spreader on the one of the first lateral side and the second lateral side of the flow channel, whereby a discharge density of the flow of the crop residue on the one of the first lateral side and the second lateral side is increased; and
   a chopper operable to cut the crop residue, wherein the chopper is positioned within the flow channel between the residue distributor and the spreader, such that the residue distributor is positioned upstream of the chopper.

2. The residue distribution system set forth in claim 1, wherein the residue distributor includes at least one fin selectively controllable between a first position operable to direct the flow of the crop residue toward the first lateral side of the flow channel, and a second position operable to direct the flow of the crop residue toward the second lateral side of the flow channel.

3. The residue distribution system set forth in claim 2, wherein the at least one fin includes a plurality of fins arranged across a width of the flow channel transverse to the longitudinal axis.

4. The residue distribution system set forth in claim 2, wherein the at least one fin is selectively controllable into at least one intermediate position disposed between the first position and the second position.

5. The residue distribution system set forth in claim 2, further comprising a fin actuator coupled to the at least one fin and operable to move the at least one fin between the first position and the second position.

6. The residue distribution system set forth in claim 5, wherein the fin actuator includes one of a linear actuator operable to extend in a first linear direction and retract in a second linear direction opposite the first linear direction, and a rotary actuator operable to rotate in a first rotational direction and a second rotational direction opposite the first rotational direction.

7. The residue distribution system set forth in claim 5, further comprising a slope sensor arranged to detect data related to a slope angle of a ground surface, wherein the slope angle is an angle formed between the ground surface and a horizontal plane in a direction perpendicular to the longitudinal axis.

8. The residue distribution system set forth in claim 7, wherein the slope sensor includes a roll angle sensor operable to detect a roll angle of the housing relative to the horizontal plane.

9. The residue distribution system set forth in claim 7, wherein the slope sensor includes a Global Positioning System sensor operable to detect a location of the housing on the ground surface, and topographic data related to an elevation profile of the ground surface in a region surrounding the location of the housing.

10. The residue distribution system set forth in claim 7, further comprising a controller in communication with the slope sensor and the fin actuator, wherein the controller includes a processor and a memory having a distribution algorithm stored thereon, wherein the processor is operable to execute the distribution algorithm to control the at least one fin between the first position and the second position based on the slope angle detected by the slope sensor.

11. The residue distribution system set forth in claim 5, further comprising a weather sensor arranged to detect data related to a wind velocity relative to the housing and a wind direction relative to the longitudinal axis.

12. The residue distribution system set forth in claim 11, further comprising a controller in communication with the weather sensor and the fin actuator, wherein the controller includes a processor and a memory having a distribution algorithm stored thereon, wherein the processor is operable to execute the distribution algorithm to control the at least one fin between the first position and the second position based on the wind direction relative to the longitudinal axis and the wind velocity relative to the housing.

13. The residue distribution system set forth in claim 5, further comprising a residue distribution sensor positioned to detect data related to distribution of the crop residue perpendicular to the longitudinal axis.

14. The residue distribution system set forth in claim 13, wherein the residue distribution sensor includes one of a camera, a lidar sensor, a radar sensor, a thermal sensor, or an infrared light sensor.

15. The residue distribution system set forth in claim 13, further comprising a controller in communication with the residue distribution sensor and the fin actuator, wherein the controller includes a processor and a memory having a distribution algorithm stored thereon, wherein the processor is operable to execute the distribution algorithm to control the at least one fin between the first position and the second position based on the distribution of the crop residue perpendicular to the longitudinal axis.

16. A harvester implement for harvesting a crop, the harvester implement comprising:
   a frame extending along a longitudinal axis;
   a harvester head coupled to the frame and operable to reap the crop;
   a separator attached to the frame and positioned to receive the crop from the harvester head, wherein the separator is operable to separate the crop material into a grain portion and a crop residue;
   a housing defining a flow channel extending along the longitudinal axis, wherein the flow channel is positioned to receive a flow of the crop residue from the separator, and is configured for conducting the flow of the crop residue therethrough in a direction moving from an upstream end of the flow channel proximate the separator toward a downstream end of the flow channel, the flow channel having a first lateral side disposed on a first side of the longitudinal axis, and a second lateral side disposed on a second side of the longitudinal axis;
   a spreader positioned proximate the downstream end of the flow channel and operable to broadcast the flow of the crop residue across a residue distribution width extending perpendicular to the longitudinal axis;
   a residue distributor positioned within the flow channel and upstream of the spreader, wherein the residue distributor is configured to direct the flow of the crop residue toward one of the first lateral side and the second lateral side of the flow channel to increase a mass flow rate of the crop residue passing through the spreader on the one of the first lateral side and the second lateral side of the flow channel, whereby a discharge density of the flow of the crop residue on the one of the first lateral side and the second lateral side is increased; and
   a chopper operable to cut the crop residue, wherein the chopper is positioned within the flow channel between the residue distributor and the spreader, such that the residue distributor is positioned upstream of the chopper.

17. The harvester implement set forth in claim 16, further comprising a controller including a processor and a memory having a distribution algorithm stored thereon, wherein the processor is operable to execute the distribution algorithm to control the residue distributor between a first position operable to direct the flow of the crop residue toward the first lateral side of the flow channel, and a second position operable to direct the flow of the crop residue toward the second lateral side of the flow channel.

18. The harvester implement set forth in claim 17, further comprising a slope sensor arranged to detect data related to a slope angle of a ground surface, wherein the slope angle is an angle formed between the ground surface and a horizontal plane in a direction perpendicular to the longitudinal axis, wherein the processor is operable to execute the distribution algorithm to control the residue distributor between the first position and the second position based on the slope angle detected by the slope sensor.

19. The harvester implement set forth in claim 17, further comprising a weather sensor arranged to detect data related to a wind velocity relative to the housing and a wind direction relative to the longitudinal axis, wherein the processor is operable to execute the distribution algorithm to control the residue distributor between the first position and the second position based on the wind direction relative to the longitudinal axis and the wind velocity relative to the housing.

20. The harvester implement set forth in claim 17, further comprising a residue distribution sensor positioned to detect data related to distribution of the crop residue perpendicular to the longitudinal axis, wherein the processor is operable to execute the distribution algorithm to control the residue distributor between the first position and the second position based on the distribution of the crop residue perpendicular to the longitudinal axis.

21. The harvester implement set forth in claim 16, wherein the residue distributor includes at least one fin selectively controllable between a first position operable to direct the flow of the crop residue toward the first lateral side of the flow channel, and a second position operable to direct the flow of the crop residue toward the second lateral side of the flow channel.

* * * * *